United States Patent [19]

Gifford et al.

[11] 4,360,308

[45] Nov. 23, 1982

[54] POSITIONAL CONTROL DEVICE

[76] Inventors: John F. Gifford, 165 Farm Rd., Woodside, Calif. 94062; Edward Sliger, 5589 Starcrest Dr., San Jose, Calif. 95123; Joaquin Leal, 1236 Reed Rd., Yuba, Calif. 95991

[21] Appl. No.: 211,230

[22] Filed: Nov. 28, 1980

Related U.S. Application Data

[63] Continuation of Ser. No. 955,611, Oct. 30, 1978, abandoned.

[51] Int. Cl.³ ............................................. B65G 67/08
[52] U.S. Cl. ....................................... 414/572; 53/64; 198/810; 367/96; 414/295; 414/335
[58] Field of Search ................. 414/87, 139, 145, 148, 414/295, 296, 334, 335, 345, 397, 398, 373, 572; 198/572, 810, 868; 53/64, 493, 497, 503; 367/96

[56] References Cited

U.S. PATENT DOCUMENTS 3,223,964 12/1965 Stadlin ................................. 367/96
3,889,796 6/1975 Baily et al. ..................... 198/810 X

*Primary Examiner*—Robert G. Sheridan
*Attorney, Agent, or Firm*—Spensley, Horn, Jubas & Lubitz

[57] ABSTRACT

A positional control device for regulating the position of an object outlet adjacent a container having a floor and plurality of sides. The position of the outlet is regulated such that an object falling from the outlet would fall a distance not greater than a predetermined distance. The outlet may also be regulated such that should the outlet approach a wall closer than a predetermined distance an alarm will be activated and the position of the outlet also being regulated such that it is automatically caused to rise upward and out of the container when a predetermined condition exists.

22 Claims, 15 Drawing Figures

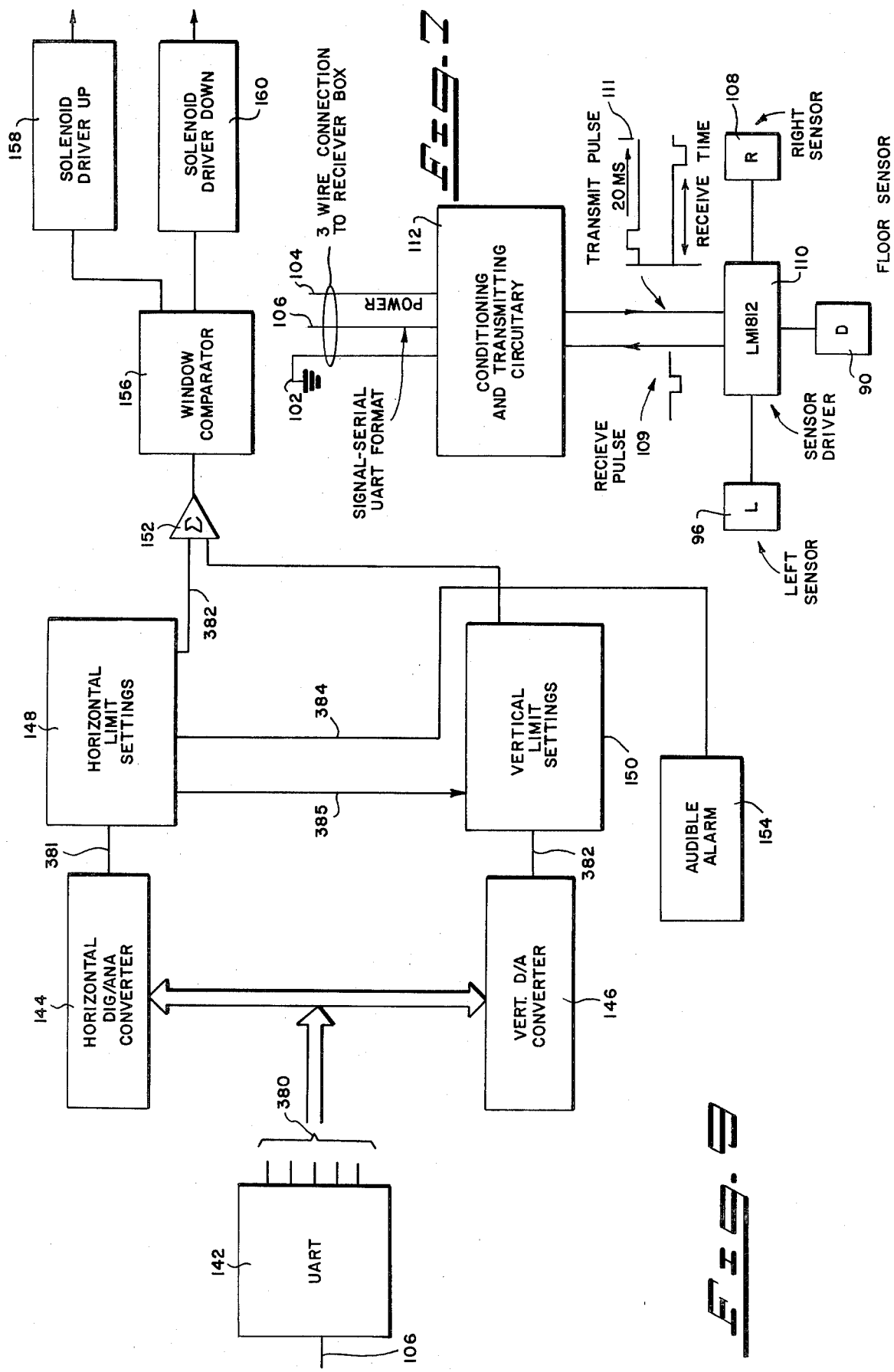

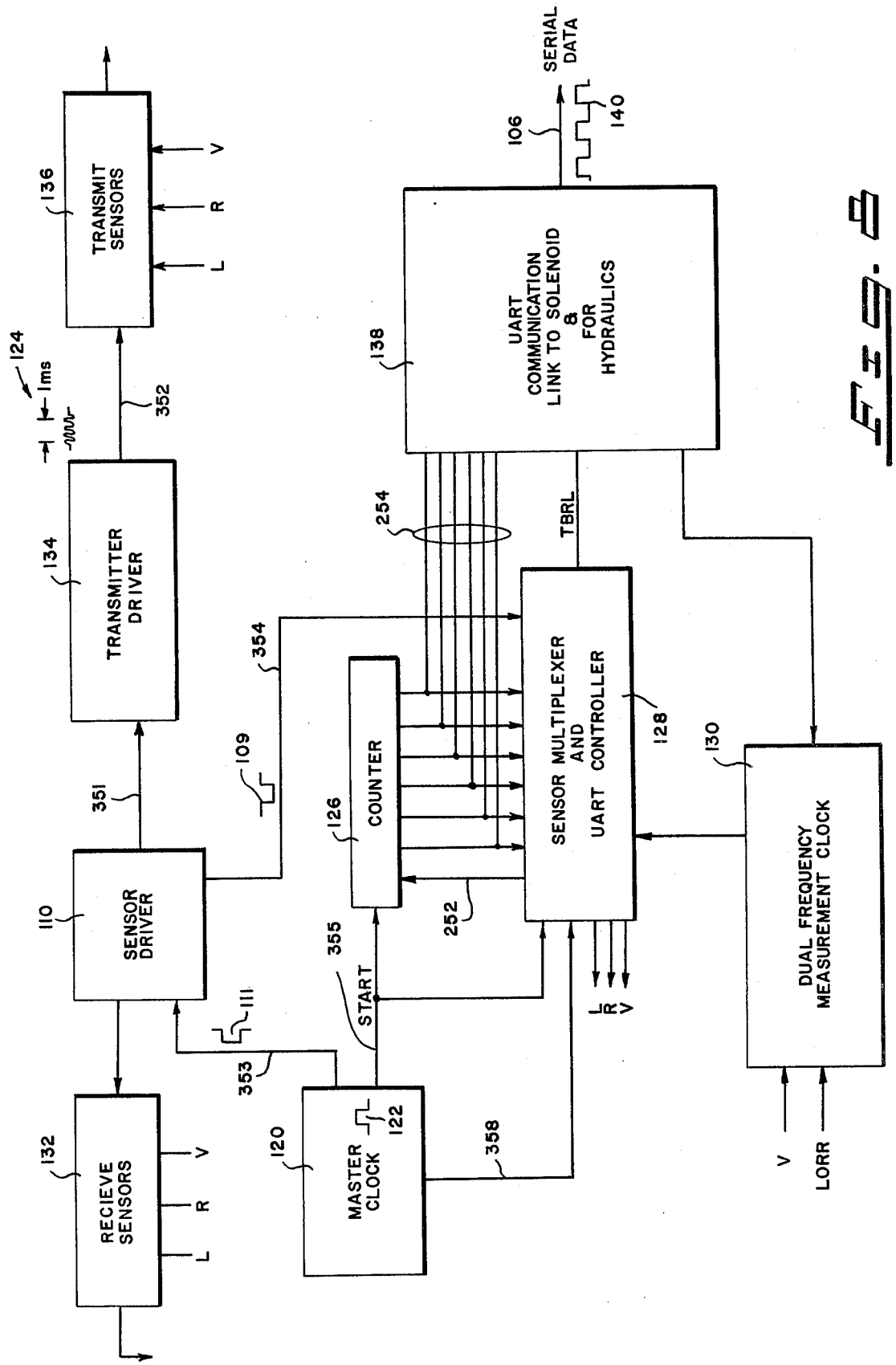

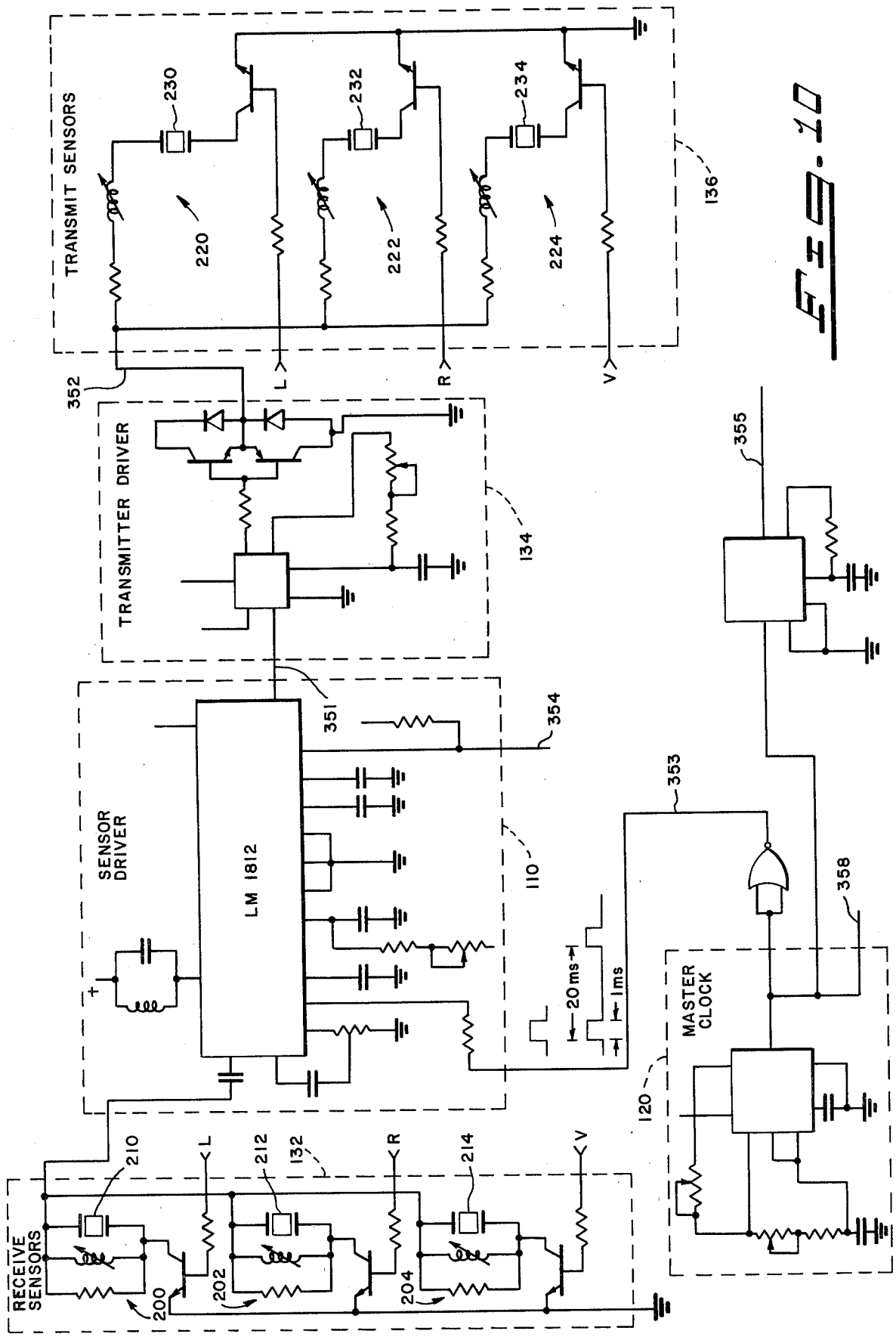

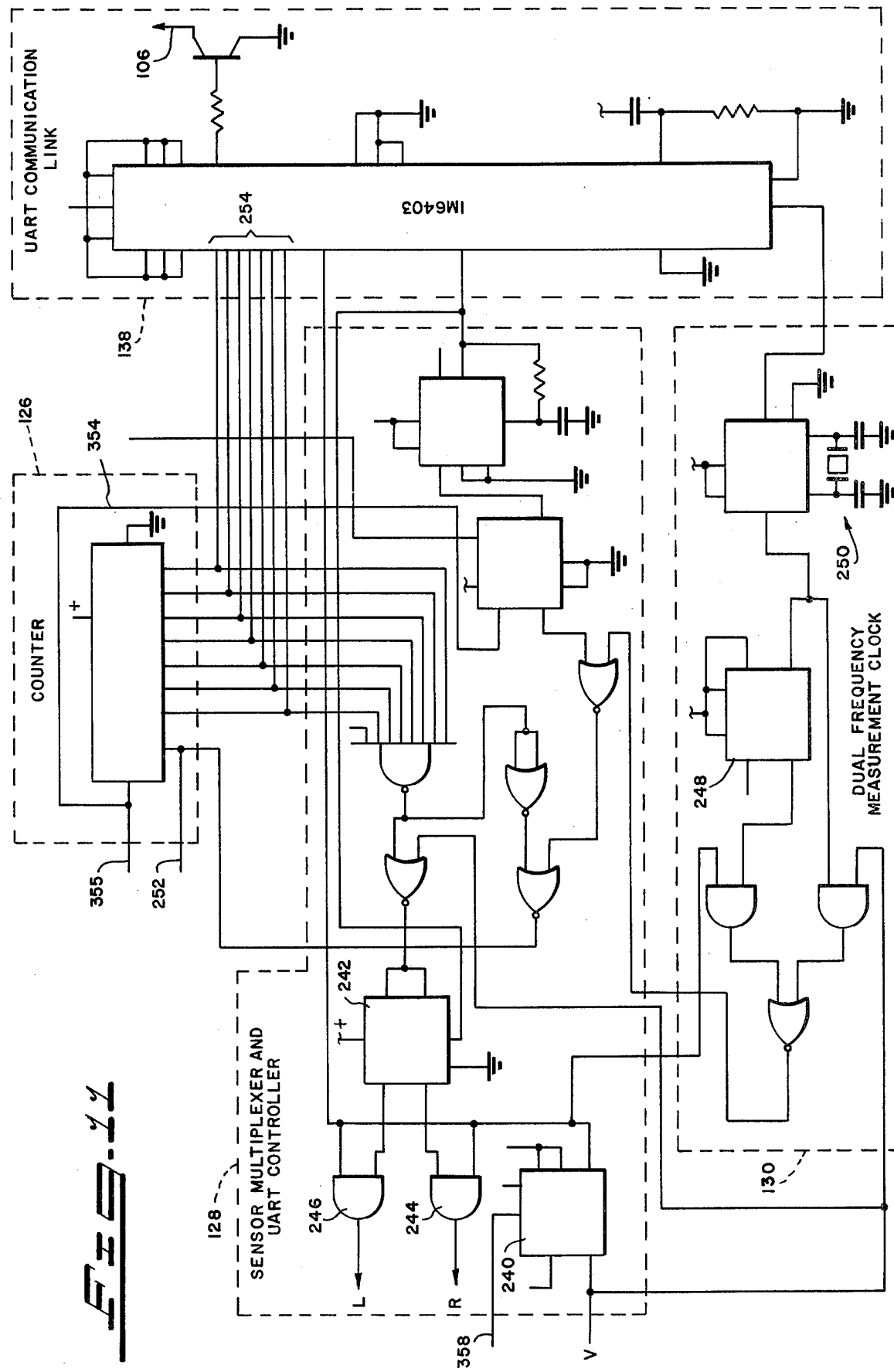

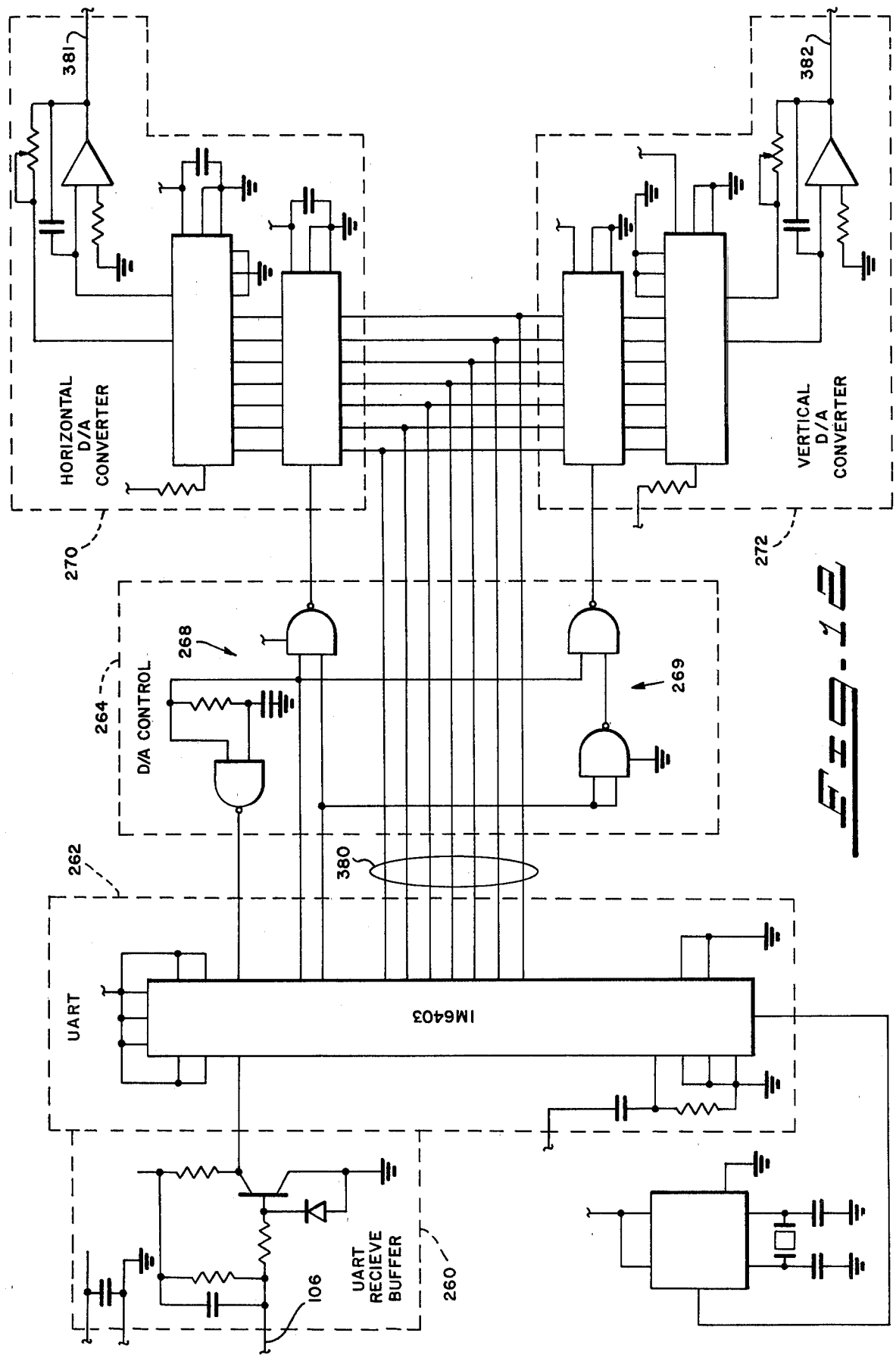

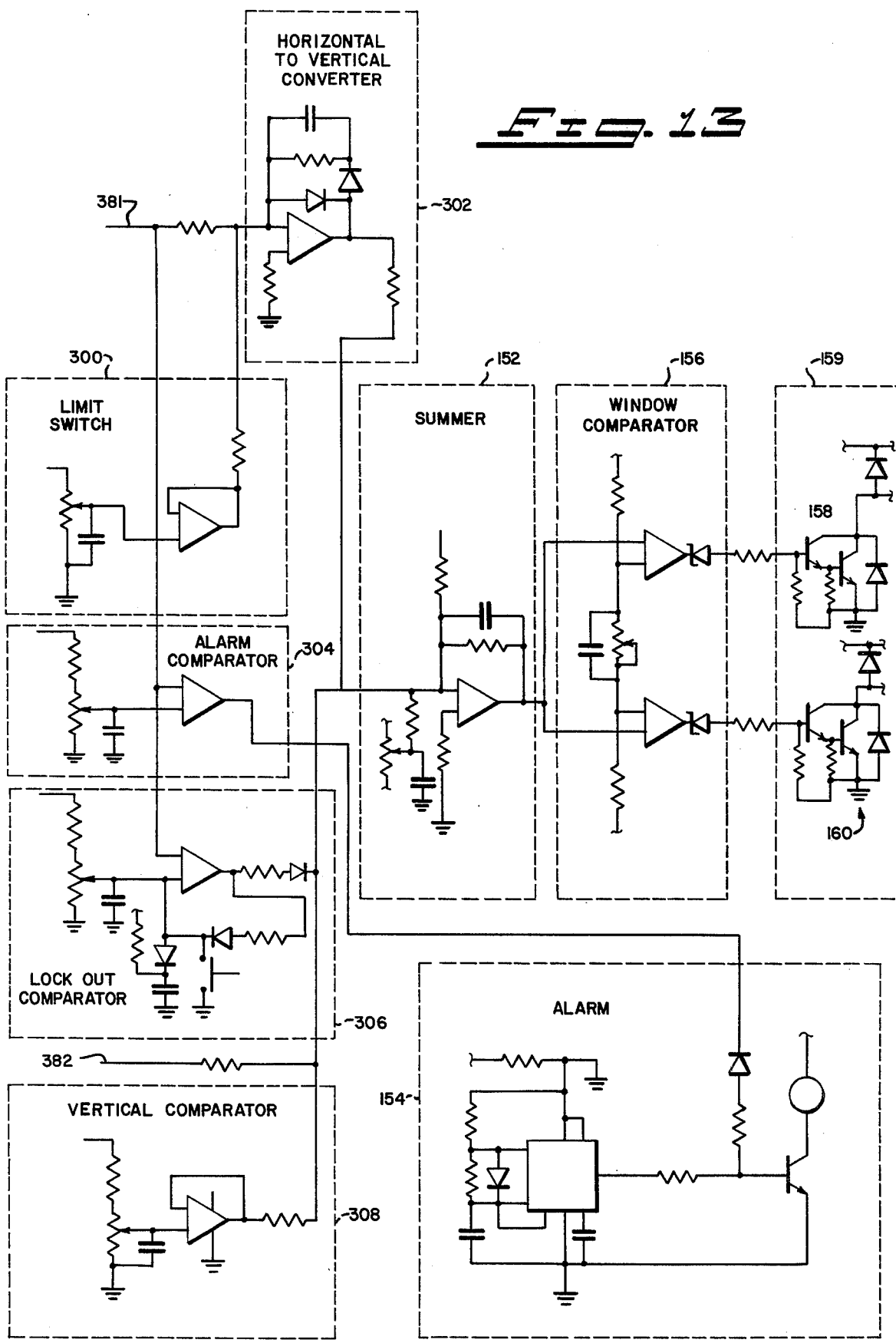

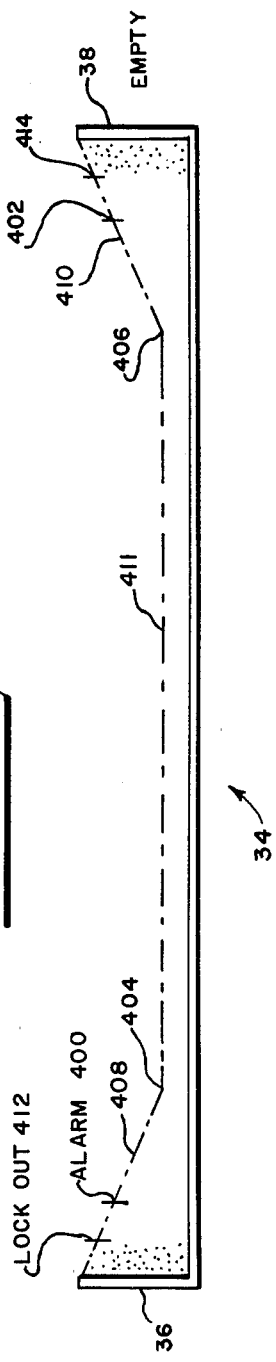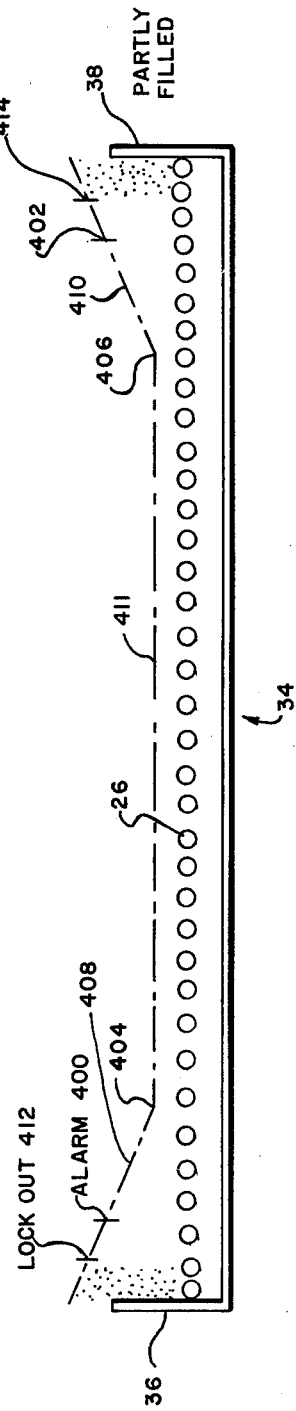

POSITIONAL CONTROL DEVICE

This is a continuation of application Ser. No. 955,611, filed Oct. 10, 1978, now abandoned.

BACKGROUND OF THE INVENTION

1. Field of the Invention

The present invention relates to the field of object handling employing feedback and in particular to systems for controlling object discharge such as depositing a harvested crop within a container.

2. Prior Art

The present invention while having general application is particularly beneficial when utilized in the harvesting of crops. It takes on added significance when utilized in connection with the harvesting of such crops as tomatoes, potatoes and similar crops. These crops are generally planted in a field in long parallel straight lines separated from one another by a distance sufficient to permit a harvest vehicle to travel between the rows of the plants. In a typical procedure used to harvest crops planted in such a manner, two vehicles are used to perform the harvesting operation. The first vehicle may be designated the harvest vehicle and the second vehicle may be referred to as the collection vehicle. The harvest vehicle typically has a device provided thereon for detaching the entire plant from the roots of the plant and ingesting the plant into the processing area of the harvest vehicle where the plant is shaken or otherwise agitated to an extent sufficient to separate the tomatoes or other crop from the plant. The plant is then shredded and ejected from the rear of the vehicle. The detached crop may then be sorted to separate the ripe crop (e.g., red tomatoes) from the unripe crop (e.g., green tomatoes). In the case of tomatoes such sorting is typically accomplished by a color sorter which automatically separates the red tomatoes from the green tomatoes. The green tomatoes and the otherwise rejected portion of the crop are then ejected from the harvest vehicle. The retained portion of the crop may then be passed through further screening processes which in some instances may be performed by workers that further separate the more desirable part of the crop from the undesirable. Once this final selection is made the desirable portion of the crop is carried by a conveyer system that is mounted on the harvest vehicle. The conveyer system extends upward and outward from the harvest vehicle to the collection vehicle and down into the container located on the bed of the collection vehicle. The collection vehicle also travels across the field between parallel rows of plants and may be traveling in the space between the rows which is adjacent the space in which the harvest vehicle is traveling.

Each of these two vehicles is operated by a driver. It is the general objective of both drivers to so operate their vehicles that the crop which is being carried by the conveyer from the harvest vehicle to the collection vehicle is deposited within the collection vehicle in a way that the crop is not damaged. This generally means that the crop should not fall more than a certain distance, preferably 8 to 10 inches, if bruising is to be avoided.

It is desirable that the drivers of the two vehicles control the vehicles and the conveyer such that the conveyer arm which is mounted on the harvest vehicle and which extends into the container on the collection vehicle does not impact any of the walls of the container and does not contact the floor of the container. The drivers must control the position of the end of the conveyer or any attachments thereto which extend within the container of the collection vehicle so that it does not damage the harvest already deposited in the collection vehicle and such that the crop does not fall more than a certain distance which would damage the crop.

Although the objective of the drivers is relatively easy to express, there are various practical difficulties which arise making it most difficult for the drivers to work together to efficiently accomplish their objective. One of the difficulties results from the fact that each vehicle is independently operated by a separate driver. Each driver in turn is occupied with many considerations which are uniquely determined by the particular vehicle which he is operating. For example the driver which is operating the harvest vehicle must operate his vehicle to enable the mechanism to remove the plant from the ground without cutting too high on the plant and without cutting too low. In the event that the cut is made too high, useful portions of the crop may be lost. In the event the cut is made too low excessive dirt may contaminate the selected crop and sorting is made more difficult. This driver must also be concerned with guiding his vehicle in a straight line, and he must also take care to avoid holes in his path. He is further charged with the supervision of workers stationed on the vehicle to do sorting. This driver must also be concerned with the speed of his vehicle and the speed relative to the speed of the collection vehicle. Since the conveyer mechanism is mounted on the harvest vehicle this first driver also has responsibility for adjusting the elevational position of the conveyer such that it does not come in contact with the crop which has been deposited within the collection vehicle. If the conveyer mechanism is allowed to contact the crop already deposited in the collection vehicle, excessive damage may occur to the crop resulting in a low yield.

Similar considerations and activities occupy the driver of the collection vehicle. This driver must also be concerned with guiding his vehicle in a straight path between the rows of plants, avoiding holes in his path, controlling the speed of his vehicle so as not to cause the conveyer to crash into one end or the other of the container on his vehicle and monitoring the level of the crop deposited in his vehicle.

If the drivers can cooperate to meet their objectives, the collection vehicle will be filled with the crop and a minimal amount of crop will be damaged. The problem of controlling the position of the end of the conveyer within the container on the collection vehicle is not only a result of the many considerations which occupy the mind of the drivers, but is also compounded by the physical dimensions of the container. This problem can be illustrated by considering that if the conveyer is positioned near the middle of the length of the container there is a great margin for error and ample time within which to raise the conveyer out of the container. However, as the conveyer approaches one end or the other of the container it becomes clear that less and less time is available within which to raise the conveyer out of the container in the event that one of the two vehicles suddenly changes velocity. This translates to a much smaller margin for error. It is therefore desirable that as the conveyer approaches one end or the other of the container the conveyer should be kept at a greater elevation above the floor of the container so that less time is required to raise the end of the conveyer above the walls of the container.

If the operators of these two vehicles are successful in meeting their objectives, the container will be filled with a crop which is relatively undamaged, and the integrity of the conveyer will be maintained. If the drivers are not successful, the harvested crop will have a high percentage of damage resulting in low yield and possible rejection of the entire crop. Other catastrophic consequences of a failure to meet the objectives by the drivers may be a damaged or destroyed conveyer. This would in turn necessitate repairs and probably result in a decrease in harvesting time and possibly unharvested crop or destruction of part of the crop. It is of prime importance that the operators of the harvest vehicle and the collection vehicle be able to operate in close cooperation. The degree of cooperation could be greatly increased if each driver had fewer matters with which to concern himself. One of the most crucial factors with which each driver is concerned is the positioning of the conveyer with respect to the container on the collection vehicle and the level of the crop.

It is thus an object of the present invention to provide a control means for automatically and regulating the vertical and horizontal position of the conveyer means with respect to the container on the collection vehicle. It is a further object of the invention to activate an audible alarm warning the drivers in the event that the end of the conveyer means approaches either end of the container. It is a further object of the invention to provide a means to automatically raise the conveyer means above the walls of the container in the event that the drivers fail to correctly respond to the alarm.

It is again an object of this invention to automatically maintain the height of the conveyer means above the level of the crop already deposited in the container. This insures that the crop being deposited in the container does not fall more than a preselected distance thereby reducing the damage resulting from the fall of the crop into the vehicle. It also insures that the conveyer means will not impact this crop. It is a general object of the invention to increase the efficiency of the harvest vehicle and to increase the yield of the harvest.

Other objects and advantages of the present invention will become apparent upon inspection of the accompanying figures and the detailed description of the present embodiment of the invention.

SUMMARY OF THE INVENTION

The present invention comprises a control means for sensing the position of the discharge portion of a conveyer relative to the walls and the floor of the container (or the crop level therein), and for regulating the position of the discharge portion such that it is retained within predetermined limits of travel. The present invention utilizes at least one sensor device mounted in the vicinity of the discharge portion of the conveyer to determine the position of the discharge portion with respect to the forward wall of the container, the rearward wall of the container or the floor or crop within the container.

To determine the position with respect to all three planes of interest, three sensors are employed. It is within the broad scope of the invention to employ only one sensor to control for example the fall distance of the object.

The present invention also provides electronic control and processing means for processing the output signal of these sensor devices so as to produce signals which are representative of the distance from the sensor to the walls of the container or from the sensor to the level of the crop deposited within the container. These signals are processed to activate a drive means for changing the position of the discharge end of the conveyer according to the magnitude and polarity of the distance signals received from the sensors. This change of position results in a change in the signals from the sensors thus completing the control loop and feedback.

Means are also provided such that when certain of the signals exceed predetermined limits an alarm may be sounded and in the event there is not a correct response to the alarm by the drivers the discharge portion of the conveyer is automatically raised above the walls of the container so as to avoid damage to the conveyer and to the walls of the truck.

Additional features of the present invention include the means of sequential activation of the three sensors. More specifically when the sensors are first activated a horizontally directed sensor is first activated, then a vertically directed sensor is activated then the second horizontal sensor is activated and next the vertical sensor is activated. In the present invention this sequence of activation is continued until it is determined which of said horizontal sensors is located more closely to a wall of the container. When it is determined which horizontal sensor is closer to a wall of the container, the present invention ceases to activate the other horizontally directed sensor and thereafter the system will alternately activate the vertical sensor and the horizontal sensor which is closer to a wall.

Another feature of the present invention is the use of a dual frequency clock to increase the resolution of the multiplexed system along one axis. This is implemented by a digital counter being caused to count at one of the dual frequencies when the vertical sensor is activated and being caused to count at a second frequency when either of the horizontal sensors is activated.

Another feature of the present invention is the utilization of the signal representative of the horizontal distance from the sensor to the nearer wall of the container to modify the limit which is placed on the vertical distance within which the discharge portion of the conveyer is allowed to approach the crop or the floor of the container. In other words, as the discharge portion of the conveyer approaches either end of the container, less and less time is available to remove the discharge portion out of the container. It is therefore desirable that the discharge portion of the conveyer be required to remain above a predetermined distance which increases as the discharge portion approaches closer and closer to the wall of the container. The present invention provides for means to accomplish this result.

Other novel features of the present invention will become apparent upon an inspection of the figures and a detailed reading of the description of a particular embodiment which follows.

DESCRIPTION OF THE FIGURES

FIG. 7 is a functional block diagram of that portion of the present invention which is mounted upon the device the position of which is to be controlled.

FIG. 8 is a more detailed functional block diagram of that part of the present invention shown in FIG. 7 and is used to illustrate the functional interrelationship of the conditioning and transmitting circuitry shown in FIG. 7.

FIG. 9 is a functional block diagram of that portion of the present invention which is remote from that portion of the present invention illustrated in FIG. 8.

FIG. 10 is a detailed circuit diagram showing a specific embodiment of a portion of the functional block diagram shown in FIG. 8.

FIG. 11 is a detailed circuit diagram illustrating a specific embodiment of a portion of the functional block diagram illustrated in FIG. 8.

FIG. 12 is a detailed circuit diagram illustrating a specific embodiment of a portion of the functional block diagram shown in FIG. 9.

FIG. 13 is a detailed circuit diagram illustrating a specific embodient of a second portion of the functional block diagram shown in FIG. 9.

FIG. 14 is a depiction of the ideal limits of travel placed upon the discharge portion of the conveyer by the present invention for an empty container.

FIG. 15 is a depiction of the ideal limits of travel placed upon the discharge portion of the conveyer by the present invention for a partially filled container.

DETAILED DESCRIPTION OF THE PREFERRED EMBODIMENT

In order to appreciate the operation of the present invention it is helpful if one has a thorough understanding of the environment within which the invention may be employed. To that end reference is made to FIGS. 1, 2 and 3. Although the description of the present embodiment of the invention will be directed primarily to the harvesting of a crop of tomatoes, it should be understood that the invention is not intended to be limited to applications relating to the harvesting of tomatoes or potatoes. For that matter, the broad aspects of the invention are not intended to be limited to the harvesting of a crop. The control system of the present invention is readily adaptable to be utilized wherever it is desirable to control the position of a means for discharging material or objects into a container. Further, although the present embodiment disclosed herein makes reference to the container having two parallel generally opposed sides or walls, it should be specifically understood that the invention is readily adaptable for use with containers of virtually any shape. The only requirement is that the walls of the container be oriented so as to cause a reflection of a sensor signal such that the reflection may be detected.

Figure 1:
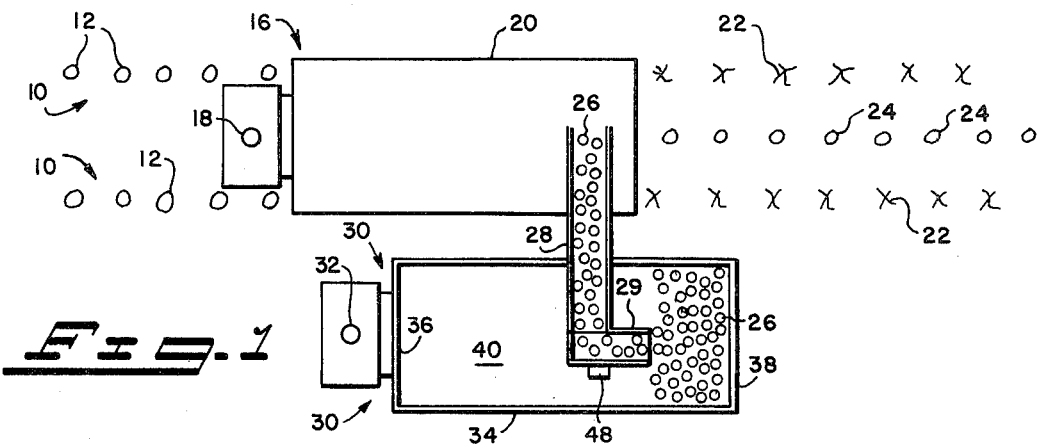
FIG. 1 is an overhead plan view of a harvest vehicle and a collection vehicle utilizing the present invention.

Crops such as tomatoes and potatoes are typically planted in long straight and parallel rows 10 as shown in FIG. 1. The individual plants in these rows being indicated as 12. Each of these rows is generally separated from the adjacent row by a path 14 sufficiently wide to allow a vehicle 16 driven by a driver 18 to drive between the rows for easy harvesting of the crop. The harvesting is performed by the harvest vehicle 16 which is supplied with a mechanism (not shown) which is intended to remove the entire plant 12 from the ground and deposit the plant, including the vegetable or fruit to be harvested, within the processing area 20 of the harvest vehicle 16. Within the processing area 20 of the harvest vehicle 16 are located various mechanical devices which typically agitate the plant 12 to separate the plant from the fruit or crop attached to the plant. The stripped plant 22 may then be shredded and discarded. The crop is then sorted. Once this sorting process is finished the tomatoes 26 chosen to be marketed are placed on a means such as conveyor 28 which moves these tomatoes out of the harvest vehicle 16 and into a collection vehicle 30 which is driven by a second driver 32. The conveyor system 28 has a discharge portion 29 which extends down and into the container 34 located on the collection vehicle 30. The ripe tomatoes 26 travel along the conveyer 28 until they reach the discharge portion 29 at which point the tomatoes 26 are allowed to fall off the discharge portion 29 of the conveyer belt 28 onto the floor 40 of the container 34. In harvest systems of the prior art this fall is typically on the order of 36 inches. The container 34 is typically a large tub-like container having at least a forward wall 36 and a rearward wall 38 which are of primary concern with respect to the operation of the present invention. During the harvesting of the crop the two vehicles 16 and 30 travel along the paths 14 at a rather slow speed which may be approximately 5 miles or less per hour. It is the general objective of the drivers 18 and 32 of these vehicles to fill the container 34 uniformly along its length from the front wall 36 to the rearward wall 38. It is also required that the drivers operate the vehicles such that discharge portion 29 of the conveyor belt 28 which is mounted on the harvesting vehicle 16 does not come into contact with any of the walls or floor of the container 34. As the crop is deposited into the container 34 the level of the crop will increase and as the level of the crop increases driver 32 must inform driver 18 so that driver 18 can activate the controls of the conveyor belt 28 and raise the discharge portion 29 above the level of the crop so as to avoid damaging the crop as a result of contact with the discharge portion 29. The drivers 18 and 32 have a rather sophisticated positional control problem.

Figure 2:
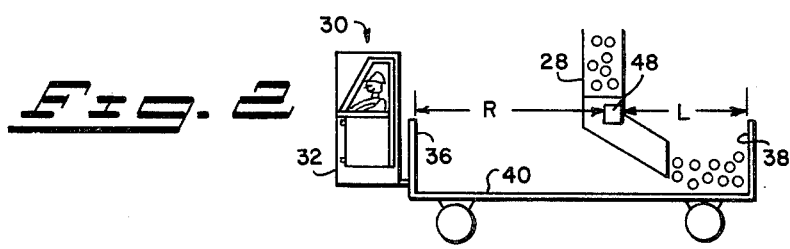
FIG. 2 is a partial cutaway of a side view of the collection vehicle shown in FIG. 1.

In order to fill the container 34 uniformly from one end 36 to the other end 38, it is necessary that the drivers gradually move the position of the dischage portion 29 toward the forward wall 36 and toward the rearward wall 38 of container 34 as shown in FIG. 2. At the same time the drivers must cooperate to insure that the discharge portion 29 does not rise too far above the level of the crop in the bed of the container 34 and thereby permit the crop, such as tomatoes, to fall a distance which would cause damage to the crop. It is desired to keep the fall distance at about 10 inches. Other than controlling the speed and direction of their respective vehicles, the only other means of controlling the position of the discharge portion 29 is by activating the hydraulic drive means 78 or 79 and cable assembly which support and maneuver the conveyor belt 28 which may have many jointed arms as shown in FIG. 3.

Figures 3, 4:
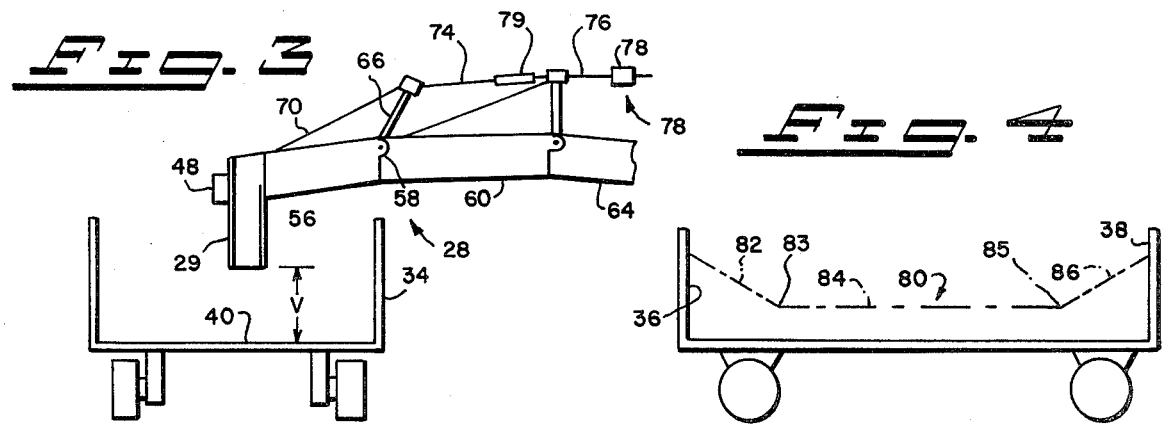
FIG. 3 is a partial cutaway end view of the collection vehicle and the conveyer utilizing the control means of the present invention.
FIG. 4 shows the variation of the desired vertical limit on the travel of the discharge portion of the conveyer as a function of proximity to a wall of the container.

The particular conveyor belt 28 shown in FIG. 3 comprises an outer arm 56 which is pivoted about pivot 58, a center arm 60 also attached to pivot 58 and attached to pivot 62, and an inner arm 64. The conveyor belt also has vertical supporting members 66 and 68 and cables 70, 74 and 76. The actuation of hydraulic drive means 78 and/or 79 will cause the discharge portion 29 to be raised or lowered so that it can be taken out of the container 34 or allowed to settle lower into the container. A portion of the device of the present invention shown as 48 in FIGS. 1 and 3 senses the position of the discharge portion 29 within the container 34 and transmits these positional signals to processing circuits which cause the activation of the hydraulic drive means 78 and 79, thereby automatically controlling the position of the discharge portion 29 within the container 34. Since it is desired to uniformly fill the container 34 from end 36 to the rear end there are times when it is necessary to allow the discharge portion of the conveyor means to approach the ends of the container 34. As the discharge portion 29 approaches either end of the container 34, there is less time available to raise the discharge portion out of the container 34 in the event of a sudden velocity change of vehicles 16 or 30. It is therefore desirable that the discharge portion 29 be required to remain above a height which gradually increases as the discharge portion gets closer to the wall 36 or 38 of the container 34. Since in the present embodiment it is also desired that the crop which falls off the discharge portion of the conveyor does not fall a distance greater than approximately 8 to 12 inches, the combination of these two vertical restrictions results in a composite requirement on the minimal vertical position of the discharge portion which is graphically illustrated in FIG. 4. It is only at the extreme ends of the container 34 that the crop is allowed to fall more than the desired 8 to 12 inches, since the integrity of the conveyor belt 28 is then of overriding concern.

FIG. 4 is a representation of the container 34 showing the forward wall 36 and the rearward wall 38. The generally U-shaped line 80 is comprised of three segments. Segment 84 is level and occupies the central portion of the length of the container. This level portion 84 ends at point 83 and point 85. Beyond point 83 and point 85 as one approaches more closely either forward wall 36 or rearward wall 38 the decreasing amount of time allowed to raise the discharge portion 29 out of the container 34 results in a gradually increasing minimum vertical distance below which the discharge portion 29 must not be allowed to travel. The control system of the present invention takes this generally U-shaped vertical minimum height requirement as represented by sloping portions 82 and 86 and level portion 84 into consideration when it processes the signals which it receives that indicate the position of the discharge portion 29 of the conveyor belt 28. The processing of these signals under the above vertical height restrictions results in control signals which are used to activate solenoids which cause the hydraulic drive means 78 and 79 to operate and thereby adjust the position of the discharge portion 29 within the container 34 so as to meet the requirements as illustrated in FIG. 4. By automatically controlling the position of the discharge portion 29, the drivers of the respective harvest vehicle 16 and collection vehicle 30 are able to focus their attention on the many other matters outlined earlier which occupy them.

Figure 5:
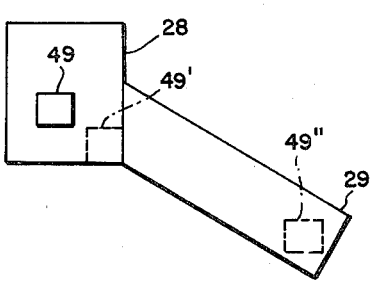
FIG. 5 illustrates various possible positions for attaching the device of the present invention upon the discharge portion of a conveyer.

Although in FIGS. 1 and 3 the sensor portion 48 of the control means is shown as being affixed rather generally to the discharge portion 29, the specific location of the sensor portion 48 of the control means can be placed most anywhere near the discharge portion 29. FIG. 5 shows the three locations designated 49, 49' and 49". Since it is desirable to control the precise position of the lower end of the discharge portion 29 a convenient place to locate the control sensors would be at the location 49". This is not to say however that the location could not be at the upper end of the discharge portion 29 and mounted on the conveyor means 28 as shown at position 49'. Other locations such as 49 are also feasible and easily accommodated by a mere adjustment of the various limit comparators included within the processing circuitry of the present invention.

Figure 6:
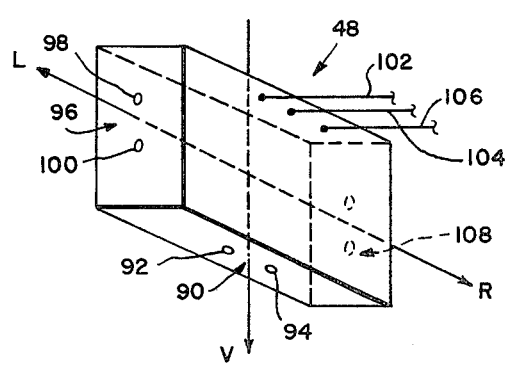
FIG. 6 is a perspective view of the portion of the present invention which is attached to the discharge portion of the conveyer.

Having explained generally the environment in which the present invention is intended to operate and the general goals and principles of operation there is shown in FIG. 6 a perspective view of the sensor portion 48 of the control device of the present invention. The sensor portion 48 comprises three sensors. One sensor is located so as to operate in a vertical direction and to sense the position of the discharge portion 29 with respect to the level of the crop deposited within the container 34. Two other sensors are oriented to detect the horizontal position of the discharge portion 29 with respect to the forward wall 36 and the rearward wall 38 of the container. Each sensor further comprises a transmit sensor and a receive sensor. Shown in FIG. 6 are two of these sensors. Sensor 90 comprises a first transmit sensor 92 and a first receive sensor 94, the second sensor 96 comprises a second transmit sensor 98 and a second receive sensor 100. These sensor means are of the type manufactured by MASSA, Inc. and particularly described in U.S. Pat. Nos. 3,578,995, 3,638,052 and 2,967,957. These sensors are sonic sensors.

The transmit sensor sends out a sonic pulse which produces an echo that is detected by the receive sensor of the particular sensor. The present invention provides electronic circuitry to generate transmission of the sonic pulse and a signal upon reception of the echo of the sonic pulse. These signals can be used to start and stop an electronic counter which thereby produces a count on the counter which is representative of the time taken for the echo of the sonic pulse to be received by the receive sensor. This count can be translated into a signal which represents the distance between the sensor and the object off which the echo rebounded.

FIG. 7 is a vastly simplified functional block diagram of that portion of the present invention referred to as the sensor portion 48 which is mounted on the discharge portion 29 of the conveyor belt 28. FIG. 7 shows the functional interrelationship of a first sensor 90, a second sensor 96, a third sensor 108, a sensor driver circuit 110 and the conditioning and transmitting circuitry 112. These various components combine to produce a single output signal which appears on lead 106. This data is in serial format and is representative of the distance between the discharge portion 29 and the object detected by the appropriate sensor. These elements are all powered by a single power input line designated 104 which is a positive 24 volt DC power supply. A common ground 102 provides a voltage reference for the various elements. As shown in FIG. 7 each of the sensors 96, 90 and 108 are functionally related only through the sensor driver circuitry 110 which is a standard circuit package available from National Semiconductors under the part no. LM 1812. The function of the sensor driver circuit 110 is to receive from the conditioning and transmitting circuitry 112 a transmit pulse 111 which instructs the sensor driver 110 to activate the transmit sensors of the various sensors. The appropriate sensor will then be activated such that the transmit sensor of the selected sensor will generate a sonic output pulse. This sonic output pulse travels outward from the transmit sensor until it contacts a solid object (crop or container 34) whereupon a sonic rebound signal or echo will occur and travel back toward the receive sensor of the selected sensor. The particular receive sensor will produce a signal which informs the sensor driver 110 that the echo has been received. It then becomes the function of the sensor driver circuit 110 to inform the conditioning and transmitting circuitry 112 that an echo has been received. This function is performed by the transmission by the sensor driver 110 of a receive pulse 109 to the conditioning and transmitting circuitry 112. The conditioning and transmitting circuitry 112 has within it the necessary electronic processing circuits to produce an output signal which is representative of the time elapsed between the transmission of the sonic pulse and the reception of the echo of that pulse. The conditioning and transmitting circuitry 112 further processes this output signal and by means of lead 106 transmits this information to that portion of the control device of the present invention which is mounted on the harvest vehicle 16.

Although not specifically shown in FIG. 7 there is also communication of information between the conditioning and transmitting circuitry 112 and each of the sensors 90, 96 and 108. Within the conditioning and transmitting circuitry 112 are logic means which determines which one of the three sensors shall be on at a given time. The logic is formulated to allow only one sensor 90, 96 or 108 to be activated at any particular instant. The logic is further formulated such that for an initial period of time the sensors are activated in a first sequence which is sensor 96, sensor 90, sensor 108, sensor 90, sensor 96, sensor 90, etc. That is, first a horizontally directed sensor is activated, then the vertically oriented sensor is activated, then the other horizontal sensor is activated, then the vertical sensor is activated and then the first horizontal sensor is activated. This sequence of activation of the sensors is continued until it is determined that either sensor 96 or sensor 108 is nearer to a wall of the container 34. Once it is determined that one of the horizontal sensors is nearer than the other, the sequence of activation of the sensors is such that the vertical sensor and the horizontal sensor which is nearer to a wall of the container are alternately activated and the other horizontal sensor is not activated. The logic which selects which of the sequences is to be employed is located within the conditioning and transmitting circuitry 112 which is explained in greater detail in the discussion of FIG. 8.

The transmit pulse 111 which causes the sensor driver 110 to activate the sensor which has been selected for activation may of course take on a variety of forms. However, for purposes of the present invention and partially as a result of the physical dimensions of the container 34 most often used to collect the crop, it has been decided that the transmit pulse 111 shall have a frequency of 50 hertz and a duration of 1 millisecond. In addition, once the sensor driver 110 has detected that an echo has been received, the sensor driver 110 provides the transmitting and conditioning circuitry 112 with a receive pulse 109 which is separated from the transmit pulse 111 by a time which is proportional to the distance between the sensor (96, 110 or 108) and the wall or floor (or crop) of the container 34. Once the sensor driver circuitry 110 has selected a particular transmit sensor to transmit the sonic pulse the transmit sensor will transmit a sonic pulse of 40,000 hertz for a 1 millisecond duration. Since the receive sensor will generate a receive signal for as long as it is receiving an echo it is convenient that the indication that reception of the echo has taken place also be indicated by a 1 millisecond pulse. Thus with respect to FIG. 7 the signals of interest are the transmit pulse 111 sent from the conditioning and transmitting circuitry 112 to the sensor driver circuitry 110 instructing the sensor driver circuitry to energize a transmit sensor so that it can transmit its sonic pulse. Another signal of interest is the actual sonic pulse produced by the sonic transmit sensor and the signal generated by the receive sensor upon detecting the echo of the transmitted sonic pulse. The last signal which is of particular interest is the receive pulse 109 generated by the sensor driver circuit 110 in response to an indication that a receive sensor has detected an echo. In addition to these four signals, there is produced in FIG. 7 by the conditioning and transmitting circuitry 112 a serial format signal which is transmitted via lead 106 which is representative of the distance between the sensor and the object which caused the echo. A more detailed explanation of the functioning of the elements shown in FIG. 7 can be given with aid of the more detailed functional block diagram shown in FIG. 8.

A comparison of FIG. 7 and FIG. 8 would reveal that a slight modification has been made with respect to the representation of the sensors. The three separate pairs 90, 96 and 108 of transmit sensors and receive sensors shown in FIG. 7 have been rearranged so that there are now two sensor boxes 132 and 136 shown in FIG. 8. These are box 132 which comprises the receive sensors and the box 136 which comprises the transmit sensors. The sensor driver 110 remains essentially unchanged. An additional box 134, the transmitter driver, has been added to show that some sort of driving circuitry is required in order to enable the transmit sensors to produce their sonic pulse. The remaining elements shown in FIG. 8 constitute a more detailed illustration of the conditioning and transmitting circuitry 112 as shown in FIG. 7. Thus in place of element 112 in FIG. 7 there now appears in FIG. 8 a master clock 120, a counter 126, a sensor multiplexer and UART controler 128, a dual frequency measurement clock 130 and a UART communication link 138. These five elements comprise the conditioning and transmitting circuitry 112 for generating the serial data 140 representative of the distance between the sensor and the object which has caused the echo of the transmitted sonic pulse.

The explanation of the operation of FIG. 8 is most easily achieved by beginning with a discussion of the operation of the master clock 120. To further facilitate the discussion of this figure the letters L, R and V have been employed which indicate left, right and vertical respectively. These letters are used to indicate sensor 96, sensor 108 and sensor 90 respectively. That is whenever reference is made to the letter L it is to be understood that reference is made to the sensor 96 which is directed toward the rear wall 38 of the container, and whenever reference is made to the letter R, reference is made to sensor 108 which is the sensor directed toward the forward wall 36 of the container 34. Whenever reference is made to the letter V, reference is being made to the sensor 90 which is directed vertically downward towards the floor 40 of the container 34. By use of this convention the explanation of the operation of FIG. 8 is greatly simplified.

The master clock 120 produces a master clock pulse 122 which performs three functions. The master clock pulse is transmitted over lead 353, after having been slightly processed, to the sensor driver 110. The master clock pulse is also transmitted over lead 355 to the counter 126. In response to receiving the master clock pulse 122 the counter begins to count with its output being represented by the logical state of the output on leads 254. The third function served by the master clock pulse 122 is to supply a master clock pulse 122 through lead 358 to the sensor multiplexer and UART controller circuit 128. Circuit 128 uses this master clock pulse 122 to select the next sensor 96, 90 or 108 in order. Upon the reception of the master clock pulse the sensor multiplexer and UART controller 128 will select the sensor either L, R or V whichever is next in order in the selection sequence under which the sensor multiplexer and UART controller 128 is presently operating. This function of the sensor multiplexer and UART controller 128 will be explained in more detail shortly. In response to the reception of the clock pulse 122 over line 353, the sensor driver 110 will send a signal via lead 351 to the transmitter driver 134. The transmitter driver 134 will in turn generate a transmit signal 124 which is sent over lead 352. This transmit signal enables each transmit sensor, L, R and V of block 136. The transmit sensors 136 have thus been prepared such that whichever transmit sensor is energized, whether it is the L, R or V transmit sensor, that transmit sensor will produce a sonic output pulse. It should be noted that if the L transmit sensor is selected the L receive sensor will also be selected. The determination of which sensor is activated is made by the sensor multiplexer and UART controller 128.

Upon reception of the master clock pulse 122 the sensor multiplexer and UART controller 128 processes the master clock pulse which is transmitted to it over lead 358 to energize either the L, R or V pair of sensors. If the L pair of sensors is nearer to its corresponding wall of the container 34 then that particular pair of sensors will be energized. An enabling signal will appear on the L output line of the sensor multiplexer and UART controller 128 thereby causing the L transmit sensor to transmit its sonic pulse and enabling the L receive sensor to generate its output pulse when it detects the echo of the transmitted sonic pulse. Similarly if the R pair of sensors is nearer to its respective wall (the forward wall 36) of the container the sensor multiplexer and UART controller 128 will cause an output signal to appear on the R output line of the multiplexer 128. This signal will be fed into the receive sensor 132 and the transmit sensor 136 such that the R transmit sensor will produce a sonic output pulse and the R receive sensor will detect the echo thereof.

The sequence for activating the L, R and V sensors is as follows. Either the L or R sensor is first activated, then the V sensor is activated, then the other of the L or R sensor is activated, then the V sensor is activated again, and then the first activated (L or R) sensor is activated. This sequence could be represented by the series of letters L, V, R, V, L, V, R, V. Each respective letter indicating that the corresponding sensor pair has been activated. This sequence of activation continues until the sensor multiplexer and UART controller 128 determines that either the L pair of sensors or the R pair of sensors is nearer to its respective container wall. When it is detected that such is the situation then that particular horizontal sensor, that is either the L or R sensor, is activated alternately with the V sensor and the sequence could be represented by the letters L, V, L, V, L, V, L, V. The master clock 120 and the sensor multiplexer and UART controller 128 thus work together to determine which of the sensors is to be activated.

The function of the counter 126 is to provide a count which is representative of the elapsed time between the transmission of a sonic pulse by a transmit sensor and the detection of the sonic echo by the corresponding receive sensor. The counter begins counting upon reception of the master clock pulse 122 through lead 355. The counter continues to count until the sensor driver 110 indicates that an echo has been received and transmits a receive pulse 109 through lead 354 to the sensor multiplexer and UART controller 128 which is thereupon made to stop the counter. At this time the output of the counter 126 is representative of the time which has elapsed between transmission of the sonic pulse and reception of the echo. Because the speed of sound is well known, this time may be easily converted so as to be representative of the distance between the sensor and the respective wall of the container which caused the echo.

At this point the output of the counter is in a parallel format and is transmitted along leads 254 to the UART communication link 138 which converts the parallel output format to a serial output and transmits serial data 140 via lead 106 to be further processed so as to control the position of the discharge portion 29 of the conveyor belt 28.

The dual frequency measurement clock 130 utilizes the V, L and R outputs of the sensor multiplexer and UART controller 128 to select a driving signal to operate the counter 126. If the V sensor is activated the logic selects one frequency of the dual frequency measurement clock. If the L or R sensor is activated the other frequency of the dual frequency measurement clock is selected and used to drive the counter 126. Thus the counter 126 will count at different frequencies depending on whether the sensors are measuring a vertical distance or a horizontal distance. Preferably the higher of the two frequencies will be used to measure the vertical cal distance thus giving greater resolution in the vertical direction. While the functional block diagram of FIG. 8 has been described in rather functional terms the various portions of FIG. 8 can be cross-referenced with a particular embodiment shown in corresponding portions of FIGS. 10 and 11. For example, the master clock 120 represented in FIG. 8 as an empty block is shown in more detail in the block labeled 120 in FIG. 10. In addition the receive sensor block 132 is illustrated in much greater detail in FIG. 10. The receive sensor block labeled 132 in FIG. 10 shows one detailed embodiment of a circuit which will perform the functions described above with reference to the receive sensor 132 of FIG. 8. In FIG. 10 the receive sensors 132 is shown to comprise actually three receive sensor circuits labeled 200, 202 and 204, each of which comprises a crystal detector respectively numbered 210, 212 and 214. In addition, the sensor driver 110 shown as a mere block in FIG. 8 is shown in much more detail as block 110 in FIG. 10.

The block labeled LM1812 in FIG. 10 is a standard package manufactured by National Semiconductor under that part number and is readily available and well known. The transmitter driver in FIG. 8, shown as a block munbered 134, is shown in more detail in the block labeled 134 in FIG. 10. Although the circuit embodiment shown in FIG. 10 for block 134 is the preferred embodiment of the transmitter driver it should be understood that FIG. 10 is merely an illustration of one circuit which can accomplish the functional tasks described with respect to the transmitter driver 134 shown in FIG. 8. The transmit sensors designated 136 are also shown in greater detail in FIG. 10. The transmit sensors 136 are shown to actually comprise three transmit sensors labeled 220, 222, and 224, each of which contains a crystal transmitter labeled 230, 232 and 234 respectively. The detailed circuit diagram in FIG. 10 for the transmit sensor block 136 clearly illustrates how the generation by the sensor multiplexer and UART controller 128 of the signals L, R and V are used to cause the selected transmit sensor to produce its sonic pulse. The specific circuit diagram shown in FIG. 10 also shows how the transmit driver 134 causes each and every such transmit sensor to be enabled.

The remaining blocks shown in FIG. 8, that is the counter 126, the sensor multiplexer and UART controller 128, the dual frequency measurement clock 130 and the UART communication link 138 have also been described in rather functional terms in the discussion of FIG. 8. A specific circuit design which accomplishes the purposes of the various components is shown in FIG. 11. For example, the counter 126 is a standard off the shelf counter which produces a parallel binary output in response to a stepping clock input. In the particular embodiment of the invention disclosed herein the stepping clock input consists of the output of the dual frequency clock 130 as slightly modified by the sensor multiplexer and UART controller 128 and shown in more detail within the block 128 in FIG. 11. The UART communication link 138 converts the parallel output count of the counter 126 into a serial format and again is a standard off the shelf item manufactured by Intersil under part No. IM6403. This standard item is readily available and well known. FIG. 11 shows the detailed operation of the dual frequency measurement clock 130. More specifically, a crystal 250 is caused to generate a high frequency clock pulse. This clock pulse is passed through a multivibrator labeled 248 in FIG. 11 and thereby divided in half. This clock pulse is the one that is used to drive the counter in the event that either the L or R sensor pair is selected. The unmodified clock frequency is used to drive the counter 126 in the event that the V sensor pair is activated. Again the circuit embodiment shown in block 130 of FIG. 11 is merely one circuit configuration which will perform the operations described with respect to the dual frequency measurement clock 130 with reference to FIG. 8.

The sensor multiplexer and UART controller 128 shown in FIG. 8 may be constructed according to the circuit diagram presented in the sensor multiplexer and UART controller 128 shown in FIG. 11. This circuit embodiment illustrates in more detail the logic used to select the sequence for activating the various sensors and for determining which frequency of the dual frequency measurement clock 130 should be utilized to drive the counter 126. The primary hardware involved in making such selections comprises a first multivibrator 242 and a second multivibrator 240. The multivibrator 240 determines whether it is the V sensor or the L or R sensors which are activated. The multivibrator 242 makes the determination as to which of the L or R sensors are activated in the event that the V sensor is not activated. Simple AND gates 244 and 246 also play a part in making the logical determination as to whether the L, R or V sensors are to be activated. The circuit diagram illustrated in the sensor multiplexer and UART controller 128 as shown in FIG. 11 is not the only circuit configuration which will perform the functions described as characteristic of the sensor multiplexer and UART controller 128 during the discussion of FIG. 8 above. It is to be expressly understood that the circuit diagram shown in FIG. 11 is provided only for completeness of disclosure and not to limit the disclosure of the functioning of the sensor multiplexer and UART controller 128 in any way.

FIG. 9 is a functional block diagram illustrating the interrelationship of the various components which form that part of the control device of the present invention which is located remotely from that portion 48 of the present invention which is mounted on the discharge portion 29 of the conveyer belt 28. Preferably the portion of the present invention illustrated in FIG. 9 is located on the harvest vehicle 16 and in close proximity to the hydraulic drive means which actuate the conveyer belt 28 as shown in the FIGS. 1 and 3. From the description of FIG. 8 it will be recalled that the function of that portion of the present invention illustrated in FIG. 8 was to produce a serial output data train 140 which was representative of the distance between the respective sensor which produced the sonic pulse and the corresponding wall of the container 34. Similarly, it is the function of that portion of the present invention illustrated in FIG. 9 to take the serial output data train 140 as produced by the components shown in FIG. 8 and to process that serial output data train 140 so that it is suitable for driving the solenoid drivers 158 and 160. The solenoid drivers power the hydraulic drive means 78 and 79 so as to raise or lower the conveyer belt 28 and discharge portion 29 thereof so as to achieve the desired goals referred to in the early portions of this description.

FIG. 9 is most easily understood by beginning at the UART communication link 142 whose function is to receive the serial output data 140 transmitted along the lead 106 shown in FIG. 7 and to convert this serial data into a parallel data format. The parallel formated data is thereafter transmitted along leads 380 and distributed to both the horizontal digital to analog converter 144 and the vertical digital to analog converter 146. The horizontal digital to analog converter 144 takes the parallel data and by appropriate processing converts the parallel digital data into an analog signal which appears on lead 381. At this point the signal is representative of the distance between the appropriate horizontal sensor and the corresponding vertical wall of the container 34. Similarly it is the function of the vertical digital to analog converter 146 to process the parallel output data appearing on leads 380 so as to convert the parallel digital data into an analog signal which appears on lead 382. At that point the signal is of a magnitude representative of the fall distance, that is the distance which material would fall after leaving the discharge portion 29 and falling to the level of the material already deposited within the continer 34. The horizontal output signal appearing on lead 381 and the vertical output signal appearing on lead 382 form the respective input signals for a block of circuitry referred to as the horizontal limit settings 148 and the vertical limit settings 150. The horizontal output signal appearing on lead 381 is also an input to the vertical limit settings 150 along lead 385. These respective limit settings 148 and 150 are shown in greater detail in the circuit diagram appearing in FIG. 13.

The horizontal limit settings 148 perform a plurality of functions. The circuitry within the horizontal limit settings 148 is such that should the horizontal output signal appearing on line 381 fall below a predetermined value the horizontal limit settings 148 will generate a signal and transmit it along lead 384 so as to activate the alarm 154. The horizontal limit settings circuitry 148 is also such that in the event the drivers of the harvest vehicle 16 and the collection vehicle 30 do not respond properly to the warning sounded by alarm 154, and should there arise a danger that the discharge portion 29 will strike the forward wall 36 or rearward wall 38 of the collection vehicle 30 the horizontal limit settings 148 will transmit a signal along lead 382 of such magnitude and polarity so as to cause the activation of the solenoid driver 158. This will cause the discharge portion 29 to be lifted up and out of the container 34.

The horizontal limit settings 148 are also configured such that when the discharge portion 29 approaches within a predetermined distance, 5 feet in the preferred embodiment, of a wall of container 34 the vertical limit settings 150 will be increased as a function of the proximity of approach. This increase is explained in greater detail in the discussion of FIG. 13 below.

The vertical limit settings 150 compare the value of the vertical output signal appearing on line 382 with a preset value. The difference between the two is thereafter passed through a window comparator 156. Depending on the polarity of the difference and whether or not the difference exceeds the setting of the window comparator, the window comparator will cause the activation of the appropriate solenoid driver 158 or 160 so as to raise or lower the discharge portion 29 and bring it back to the desired level as determined by the predetermined value of the vertical limit settings 150. While the description of FIG. 9 has been with respect to a figure which has been greatly simplified it will nonetheless serve to orient and prepare the reader to understand the more specific and detailed explanation of the operation of the blocks shown in FIG. 9 as more particularly shown in FIGS. 12 and 13.

The UART communication link 142 and the horizontal digital to analog converter 144 as well as the vertical digital to analog converter 146 are all shown in greater detail in FIG. 12. The horizontal limit settings 148, and the vertical limit settings 150, as well as the summing amplifier 152, the window comparator 156, the alarm 154 and the solenoid driver 158 which governs the up direction and the solenoid driver 160 which governs the down direction are all more particularly shown in FIG. 13.

Referring now to FIG. 12 it can be seen that the UART communication link 142 has been divided into two blocks, a UART receive buffer 260 and a UART 262. In addition the horizontal digital to analog converter 144 and the vertical digital to analog converter 146 of FIG. 9 have been further divided so as to provide for a digital to analog control 264. The digital to analog controller 264 comprises the digital to analog control 268 in the horizontal direction as well as the digital to analog control 269 for the vertical direction. A separate block has been provided for the horizontal digital to analog converter 270 and the vertical digital to analog converter 272. The circuitry shown in the blocks in FIG. 12 which correspond to the various blocks in FIG. 9 illustrate specific configurations which are capable of performing the functions described for the various blocks of FIG. 9 above. Referring now to FIG. 12, there is shown a specific embodiment of the UART communication link 142 shown in FIG. 9. More specifically FIG. 12 shows a UART receive buffer 260, the function of which is to receive the serial digital data output 140 prior to its entry into the UART communication link 262. It is the function of the UART communication link 262 to convert the serial digital data output 140 back to parallel digital data output and to provide that output on a series of output leads which have been designated 380 in FIG. 9. The UART communication link 262 further communicates with the horizontal digital to analog control 268 and a vertical digital to analog control 269. These controls control respectively the horizontal digital to analog converter 270 and the vertical digital to analog converter 272. The horizontal digital to analog converter 270 as shown in FIG. 12 illustrates a specific embodiment of the circuitry required to convert the parallel digital output data received from the UART communication link 262 into an analog signal which is representative of the horizontal distance from the sensor to the respective wall of container 34. Similarly the vertical digital to analog converter 272 and vertical digital to analog control 269 shown in FIG. 12 also illustrate a specific circuit configuration which is capable of performing the functions required of the vertical digital to analog converter 146 described with reference to the discussion of FIG. 9. The UART communication link 262 is a standard readily available part manufactured by Intersil under the part No. IM6403. Both the horizontal digital to analog converter 270 and the vertical digital to analog converter 272 are comprised of interconnections of standard off the shelf items readily available in the industry and whose function and structure are well known.

Referring now to FIG. 13 there is shown a horizontal to vertical converter 302, a limit switch 300, a first limit conparator 304, a second limit comparator 306 and a vertical limit comparator 308. There is further shown an alarm 154, a summing amplifier 152, a window comparator 156 and a solenoid driver referred to generally as 159 comprised of an up driver 158 and a down driver 160. It can be seen from FIG. 13 that the only inputs to all of the elements shown in FIG. 13 consist of the horizontal output signal appearing on lead 381 and the vertical output signal appearing on lead 382. It is thus the function of the circuitry shown in FIG. 13 to process these two signals so as to cause the proper solenoid to be activated thereby moving the discharge portion 29 of the conveyer belt 28 in the proper direction and the proper distance.

For purposes of comparing FIGS. 9 and 13, it should be noted that the horizontal limit settings 148 of FIG. 9 correspond to the combination of elements 300, 302, 304 and 306 of FIG. 13. The vertical limit settings 150 of FIG. 9 correspond to element 308 of FIG. 13. The correspondence of the remainder of the elements is readily discernable.

The operation and interrelationship of the various components shown in FIG. 13 is as follows. Assuming for the moment that the horizontal output signal appearing on lead 381 is of such a magnitude (indicating more than 5 feet) as to not trigger any limit comparator 306 or 304 or limit switch 300, the effects of the horizontal output signal can then be ignored for the purpose of discussing the operation of the vertical limit comparator 308. The vertical limit comparator 308 is adjusted to a predetermined value and its value is compared with the value of the vertical output signal appearing on line 382. The difference between these two values is then passed through the summing amplifier 152 and into the window comparator 156. If the difference between the limit of the vertical limit comparator 308 and the vertical output signal appearing on lead 382 is greater than the level which has been preset into the window comparator 156, the window comparator will generate an output signal which will be received by the solenoid driver 159. Depending on the polarity of the difference either the solenoid up driver 158 or the solenoid down driver 160 will be activated so as to adjust the position of the discharge portion 29 in a direction to bring it back to the desired level. In the preferred embodiment the desired level is 8 to 12 inches above the level of the crop deposited in container 34. The practical effects of this circuitry (308) is that the vertical limit comparator 308 is adjusted so as to represent the vertical height at which it is desired to maintain the discharge portion 29 above the level of the tomatoes or potatoes or other material deposited within a container 34. If the vertical output signal appearing on line 382 is not within a certain range (preferably about 0.1 to 0.3 inches) of this predetermined value the window comparator 156 will be activated and the solenoid driver will in turn activate the hydraulic drive means so as to bring the position of the discharge portion 29 within the preset tolerances allowed on the desired vertical fall distance. As long as the discharge portion 29 is within the predetermined range of the desired level above the material deposited within the container 24 there is no adjustment made to its position. The discharge portion 29 is allowed to drift within those tolerances without corrective action being taken. As soon as the movement of the discharge portion 29 proceeds beyond the predetermined tolerance the window comparator 156 will be activated as described above. The allowed tolerances on the vertical position thus provide for a dead zone within which it is not necessary to use the hydraulic drive means to adjust the position of the discharge portion 29.

The operation of the horizontal limit settings 148 shown in FIG. 9 is substantially more involved than the just described vertical limit settings 150. The horizontal output signal appearing on lead 381 is compared with the preset levels of three limit comparators. The limit comparators are set such that a decreasing horizontal output signal will trigger the comparators sequentially.

Limit comparator 300 is preset at a level representing the greatest horizontal distance of the three comparators. When the horizontal output falls below the level of limit comparator 300, the horizontal to vertical converter 302 is switched into the circuit. The horizontal to vertical converter 302 selects a predetermined percentage of the difference between a predetermined constant reference and the horizontal output signal and uses it to effectively raise the value of the vertical limit comparator 308. Thus, once the limit comparator 300 is triggered, the vertical output signal on lead 382 is compared with a reference which has been increased by a percentage of the difference between a predetermined reference and the horizontal output signal on lead 381. In the preferred embodiment the percentage is approximately 39%, but can be anywhere in the range of 25 to 55% or even within a broader range depending on the specific dimensions of the container. The difference between the vertical output signal and the modified reference is processed by the summing amplifier 152 and window comparator 156 as explained above. If the discharge portion 29 is not within the prescribed range of the modified vertical limit settings, the appropriate solenoid will drive the hydraulic drive means to correct its position and reduce the difference. In the embodiment illustrated in FIG. 13, the limit comparator 300 is set to trigger at approximately 5 feet, and thus construct a minimum vertical fall distance curve which increases as the discharge portion gets closer to a wall as shown in FIG. 14 (or FIG. 15 for a partially filled collection vehicle).

Limit comparator 304 will be triggered as the magnitude of the horizontal output signal on lead 381 falls further. When this comparator 304 is triggered the alarm 154 will be activated. In the specific embodiment shown in FIG. 13 the limit comparator 304 is set to trigger at a level indicating a horizontal distance of two feet from a container wall.

In the event the drivers 18 and 32 fail to take proper corrective action when the alarm 154 is activated, the horizontal output signal will continue to fall to the point where limit comparator 306 is triggered. When this limit comparator is triggered, a signal of such magnitude and polarity is processed by the summing amplifier 152 and window comparator 156 that the solenoid up driver 158 is immediately activated to lock the discharge portion 29 above the level of the walls of the container 34. In the specific embodiment shown in FIG. 13, the limit comparator is set to activate at a horizontal output signal representative of a one foot distance from a wall of container 34. The window comparator 156 in the preferred embodiment is set for a tolerance of plus or minus 0.3 inches in the vertical direction.

While the description of FIG. 13 has been in terms of the functional relationship of the various components such as the limit switch 300, the limit comparator 306, the summing amplifier 152 and the other portions of the circuit in block form, within each such block there is shown a specific circuit configuration which is capable of performing the functions required of the blocks as described in the functional description of FIG. 13. It should be specifically understood that this is not the only circuit configuration that will accomplish the results of the positional control device of the present invention.

Referring now to FIG. 14, it can be seen that the first limit comparator 300 will be activated at point 404 and 406, 5 feet from walls 36 or 38. After the limit comparator 300 is activated, the discharge portion 29 will be required to remain within a predetermined range of sloping lines 408 and 410.

The vertical limit comparator 308 is set to keep the discharge portion 29 within a preset distance of line 411, approximately 10 inches above the floor of container 34.

The alarm 154 will sound at points 400 and 402 (two feet from the walls) and the discharge portion 29 will be raised out of container 34 at points 412 and 414 (one foot from the walls).

As the harvest progresses and the level of the crop in the container 34 rises, the situation changes and will eventually reach the position indicated in FIG. 15. The level of the crop will have risen and it is then desirable to maintain the discharge portion 29 of the conveyor belt 28 at a predetermined distance above the level of the crop 26 in the container 34. It is also desired to prevent the discharge portion 29 from contacting either end 36 or 38 of the container 34. The proper functioning of the vertical limit comparator 308 will insure that the discharge portion 29 remains above the line 411 which in the case of the present embodiment of the invention is approximately 10 inches above the level of the crop within the container 34. In the event that the horizontal travel of the discharge portion 29 extends beyond the points 402 or 400 the horizontal limit comparator 304 will sound the alarm 154 provided the discharge portion 29 is below the level of walls 36 or 38.

There has thus been described a positional control device for automatically sensing and regulating the vertical and horizontal positions of the discharge portion of a conveyor belt extending within the confines of a container. The invention provides for the activation of an alarm should the discharge portion proceed beyond a predetermined point so as to approach a wall of the container within a preset distance. There has also been provided a means to automatically raise the discharge portion above the walls of the container in the event that the drivers should fail to heed the warning of the alarm. The discharge portion is automatically maintained a predetermined height above the level of the crop which has already been deposited in the container such that the crop which is in the process of being deposited in the container does not fall more than a preselected distance. Such a control device greatly increases the efficiency of the harvest, increases the percentage yield of the crop contained within the container, and further eliminates a multitude of considerations from the minds of the drivers of the harvest vehicle and the collection vehicle thereby freeing them to more efficiently perform their other tasks. In general terms, the present invention increases the efficiency of the harvest and the profit obtained on a given crop. Although the present invention has been described in connection with a specific embodiment, many changes, additions and modifications which may be made by those possessing ordinary skill in the art, are contemplated and are considered to be within the spirit and scope of the present invention. For instance, instead of the sonic sensors employed herein, other systems employing different energy type sources and sensors could be used such as lasers and photocells, or spring feelers with potentiometers on their ends could also be employed. Another variation specifically contemplated as being within the scope of the invention would be the use of proportional hydraulic drive means rather than the on/off hydraulic drive means described herein. The invention is easily modified and adapatble to accept the electronics and hydraulic drive means which respond in an amount proportional to the magnitude of the difference between a desired distance and the distance as actually measured by the sensors (or any other appropriate control signal). The specific embodiment disclosed herein is not intended to be a definition of the limits of the present invention, but rather only an illustration thereof. The present invention is intended to be limited only by the scope of the appended claims.

I claim:

1. In a system for depositing material within a container having a floor, a first wall and a second wall, which system includes a means for moving said material into said container, said means for moving having a discharge portion for discharging said material into said container, said material having a falling distance determined by the height of said discharge portion above the floor of said container and the amount of said material already deposited in said container, the improvement comprising:

a means for providing a first output signal representative of the falling distance of said material;

a means, coupled to said first output signal, for providing a first reference signal and for comparing said first output signal with said first reference signal and for generating a difference signal representative of the difference between said first reference signal and said first output signal;

means, coupled to said difference signal, for altering the falling distance such that said falling distance is within a predetermined range of the distance represented by said first reference signal;

means for providing a second output signal representative of the distance between the discharge portion and the first and second walls;

reference means, coupled to said second output signal, for providing a second reference signal and for determining that said second output signal is less than said second reference signal;

means, coupled to said reference means and coupled to said first reference signal, for increasing said first reference signal as said second output signal decreases, provided said second output signal is below said second reference signal;

means coupled to said second output signal for providing a third reference signal and for determining that said second output signal is less than said third reference signal;

means, coupled to said means for providing a third reference signal and coupled to said discharge portion, for raising said discharge portion out of said container in the event said second output signal is less than said third reference signal.

2. The improvement according to claim 1 wherein said means for providing a second output signal comprises:

a first energy source for providing a first energy pulse directed toward said first wall, said first wall producing a first reflected energy pulse;

a first energy detector for detecting said first reflected energy pulse;

a second energy source for providing a second energy pulse directed toward said second wall, said second wall producing a second reflected energy pulse;

a second energy detector for detecting said second reflected energy pulse;

means, coupled to said first and said second energy sources and said first and said second energy detectors, for providing a first signal representative of the time between providing said first energy pulse and detecting said first reflected energy pulse and hence representative of a first distance between said first energy source and said first wall and for providing a second signal representative of the time between providing said second energy pulse and detecting said second reflected energy pulse and hence representative of a second distance between said second energy source and said second wall.

3. The improvement according to claim 2 wherein said first and said second energy sources are sonic transmitters and said first and said second energy detectors are sonic receivers.

4. The improvement according to claim 3 wherein said means, coupled to said first and second sonic transmitters and said first and second sonic receivers is a counter.

5. The improvement according to claim 4 further comprising:
   a data output lead;
   a means for comparing the magnitude of said first signal with the magnitude of said second signal and for coupling the smaller of said signals to said data output lead whereby the signal appearing on said data output lead is representative of the distance between the nearer of the first and second walls and the corresponding first and second sonic receivers.

6. In a system for depositing material within a container having a floor, a first wall and a second wall, which system includes a means for moving said material into said container, said means for moving having a discharge portion for discharging said material into said container, said material having a falling distance determined by the height of said discharge portion above the floor of said container and the amount of said material already deposited in said container, the improvement comprising:
   a first sonic transmitter mounted on said discharge portion for providing a first sonic pulse directed vertically downward toward an object said object producing a first reflected sonic pulse;
   a first sonic receiver mounted on said discharge portion for detecting said first reflected sonic pulse;
   a second transmitter mounted on said discharge portion for providing a second sonic pulse directed toward said first wall of said container said first wall producing a second reflected sonic pulse;
   a second sonic receiver mounted on said discharge portion for detecting said second reflected sonic pulse;
   a third sonic transmitter mounted on said discharge portion for providing a third sonic pulse directed toward said second wall of said container said second wall producing a third reflected sonic pulse;
   a third sonic receiver mounted on said discharge portion for detecting said third reflected sonic pulse;
   a first clock for providing a clock pulse;
   a counter for generating a count;
   a second clock for providing two stepping signals for said counter, said stepping signals being of different frequency;
   logic means, coupled to each of said sonic transmitters and sonic receivers, coupled to said first and second clocks and also coupled to said counter, for sequentially activating said transmitters and said receivers in the following recurring sequence, second, first, third, first, second . . . and for each such activation also activating said counter and causing said counter to count at a first frequency of said second clock when said first sonic transmitter and receiver are activated and for causing said counter to count at a second frequency of said second clock when said second or third sonic transmitter and receiver are activated;
   said logic means further selecting the count of said counter upon detection by one of said sonic detectors of a reflected sonic pulse said count being representative of the distance from said detector to its corresponding wall or floor of said container;
   said logic means further determining that said second sonic tranmitter and receiver or said third sonic transmitter and receiver is closer to its respective wall and thereafter activating alternately only said first sonic transmitter and receiver and the one of said second and third transmitters which has been determined to be closer to its respective wall;
   a data output line;
   a means coupled to said counter and said data output line for transmitting alternately over said data output line the counts of said counter;
   whereby the count on said data output line will sequentially be a first output signal representative of the falling distance of said material and a second output signal representative of the distance from said discharge portion to the nearer of said first and second walls;
   a first limit comparator, coupled to said first output signal, for providing a first reference signal and for comparing said first output signal with said first reference signal and for generating a difference signal representative of the difference between said first reference signal and said first output signal;
   a window comparator coupled to said difference signal, for determining that said difference signal is greater than a predetermined magnitude;
   a solenoid coupled to said window comparator for driving a hydraulic drive means in the event said difference signal is greater than said predetermined magnitude;
   hydraulic drive means coupled to said solenoid for raising or lowering said discharge portion thereby altering said falling distance such that said falling distance is within a predetermined range of the distance represented by said first reference signal;
   a second limit comparator, coupled to said second output signal and said first reference signal, for providing a second reference signal and for comparing said second output signal with said second reference signal and if said second output signal is less than said second reference signal for increasing said first reference signal as said second output signal decreases;
   a third limit comparator, coupled to said second output signal, for providing a third reference signal and for determining that said second output signal is less than said third reference signal and for activating an alarm in that event;
   a fourth limit comparator, coupled to said second output signal and a solenoid, for providing a fourth reference signal and determining that said second output signal is less than said fourth reference signal and for activating said solenoid in that event;
   said solenoid, coupled to said fourth limit comparator and hydraulic drive means, for activating said hydraulic drive means when said solenoid is activated;
   said hydraulic drive means coupled to said discharge portion for causing said discharge portion to rise above the level of said first and second walls in the event said second output signal is less than said fourth reference signal.

7. In a system for depositing material within a container having a floor, a first wall and a second wall, which system includes a means for moving said material into said container, said means for moving having a discharge portion for discharging said material into said container, said material having a falling distance determined by the height of said discharge portion above the floor of said container and the amount of said material already deposited in said container, the improvement comprising:
- a first sensor for providing a first output signal representative of the falling distance;
- a second sensor for providing a second signal representative of the distance between said second sensor and said first wall;
- a third sensor for providing a third signal representative of the distance between said third sensor and said second wall;
- a comparing means coupled to said second signal and said third signal, for determining the smaller of said second and said third signals;
- a data output line coupled to said first output signal and said second and third signals;
- logic means coupled to said first sensor, said second sensor and said third sensor and coupled to said comparing means, for activating said sensors in the cyclical order second sensor, first sensor, third sensor, first sensor, second sensor until said comparing means determines the smaller of said second and said third signals, said logic means thereafter alternately activating only said first sensor and the sensor determined to be providing the smaller signal;
- whereby the signal appearing on said data output line will comprise a cycle of said second signal, first output signal, third signal, first output signal, second signal until the smaller of said second and said third signals is determined at which time the signal on said data output line will be alternately said first output signal and a second output signal comprising the smaller of said second and said third signals.

8. The improvement according to claim 7 further comprising:
- a means coupled to said first output signal, for providing a first reference signal and for comparing said first output signal with said first reference signal and for generating a difference signal representative of the difference between said first reference signal and said first output signal;
- means, coupled to said difference signal, for altering the falling distance such that said falling distance is maintained within a predetermined range of the distance represented by said first reference signal.

9. The improvement according to claim 8 further comprising:
- means, coupled to said second output signal, for providing a second reference signal and for determining that said second output signal is less than said second reference signal;
- means, coupled to said means for providing a second reference signal and determining and coupled to said first reference signal, for increasing said first reference signal as said second output signal decreases, provided said second output signal is below said second reference signal.

10. The improvement according to claim 9 further comprising:
- means coupled to said second output signal for providing a third reference signal and for determining that said second output signal is less than said third reference signal;
- means, coupled to said means for providing a third reference signal and coupled to said discharge portion, for raising said discharge portion out of said container in the event said second output signal is less than said third reference signal.

11. The improvement according to claim 10 further comprising:
- means coupled to said second output signal for providing a fourth reference signal and for determining that said second output signal is less than said fourth reference signal;
- said means for providing a fourth reference signal being coupled to an alarm for activating said alarm in the event said second output signal is less than said fourth reference signal.

12. In a system for depositing material within a container having a floor, a first wall and a second wall which system includes a means for moving said material into said container, said means for moving having a discharge portion for discharging said material into said container, said material having a falling distance determined by the height of said discharge portion above the floor of said container and the amount of said material already deposited in said container, the improvement comprising:
- first transducer means coupled to said discharge portion for generating a first signal indicative of said falling distance;
- second transducer means coupled to said discharge portion for generating a second signal indicative of the distance between said discharge portion and said first wall;
- third transducer means coupled to said discharge portion for generating a third signal indicative of the distance between said discharge portion and said second wall; and
- logic means coupled to said first, second and third transducer means, and being responsive to said first, second and third signal, for selectively activating each said transducer means, whereby upon energizing said system, said logic means sequentially activates each said transducer means until said logic means determines whether said discharge portion is closer to said first wall or said second wall whereupon said logic means sequentially activates only said first transducer means and the one of said second and third transducer means which has been determined to be closer to its respective wall.

13. The system according to claim 12 further including:
- positioning means coupled to said discharge portion for raising and lowering said discharge portion relative to said material, and wherein
- said logic means is coupled to said positioning means and further adapted to activate said positioning means, whereby when said discharge portion becomes closer to one of said walls than some predetermined distance, said logic means activates said positioning means so as to cause said discharge portion to rise, relative to said material, above said wall and thereby avoid a collision therewith.

14. The system of claim 13 wherein said transducer means comprises a sonic transmitter and a sonic receiver.

15. In a system for depositing material within a container having a floor, a first wall and a second wall, which system includes a means for moving said material into said container, said material having a falling distance determined by the height of said discharge portion above the floor of said container and the amount of said material already deposited in said container, the improvement comprising:

transducer means coupled to said discharge portion for generating a first signal indicative of said falling distance;

sensing means coupled to said discharge portion for generating a second signal indicative of the distance between said discharge portion and said first wall and for generating a third signal indicative of the distance between said discharge portion and said second wall;

positioning means coupled to said discharge portion for raising and lowering said discharge portion relative to said material; and logic means coupled to said transducer means, said sensing means and said positioning means, and being responsive to said first, second and third signals, for selectively activating said positioning means, whereby when said discharge portion is farther from both said walls than some predetermined first distance, said logic means activates said positioning means such that said discharge portion continuously maintains a predetermined and constant falling distance, and when said discharge portion is closer to either one of said walls than said predetermined first distance, said logic means activates said positioning means such that said falling distance increases as said discharge portion approaches said wall.

16. The system of claim 15 wherein said transducer means and said sensing means each comprise at least one sonic transmitter and sonic receiver.

17. A control system for positioning an object with respect to a first surface as a function of its distance from a second surface, comprising:

first measurement means for determining a first distance, wherein the first distance is the distance between said object and said surface;

comparison means for comparing said first distance with a predetermined reference distance and providing an output which is a function of the difference between the first distance and the predetermined reference distance;

positioning means for causing the position of the object to be altered whenever the output of the comparison means exceeds predetermined limits to thereby maintain said first distance within a predetermined range;

second measurement means for determining a second distance, wherein the second distance is the distance between the object and a second surface, wherein said second surface intersects the first surface and has an edge spaced from the first surface; and modification means coupled to the second measurement means and the comparison means, for increasing the value of the predetermined reference distance when the measured second distance falls below a first set value, thereby causing the object to be moved closer to the edge of the second surface as the second distance decreases.

18. The control system of claim 17 wherein the modification means continuously increases the predetermined reference distance as the second distance decreases below the first set value, whereby as the object moves closer to the second surface it will also move closer to the edge of the second surface.

19. The control system of claims 17 or 18 further including safety means, operative when the second distance falls below a second set value which is less than the first set value, for causing the object to be moved so that it is at a distance from the first surface which exceeds the distance between the first surface and the edge of the second surface, said safety means thereby preventing a collision between the object and the second surface.

20. A control system according to claim 17 wherein said first and second measurement means include sonic transducers for directing sound waves toward the first and second surfaces and detecting sound waves reflected from said surfaces, said measurement means further including clock means for measuring the time between the directing of sound waves toward a surface and detection of sound waves reflected from said surface, said clock means providing outputs representative of the first and second distances.

21. A control system for positioning an object with respect to at least three surfaces, comprising:

a first sensor for providing a first signal representative of a first distance between the object and a first of said surfaces;

a second sensor for providing a second signal representative of a second distance between the object and a second of said surfaces;

a third sensor for providing a third signal representative of a third distance between the object and a third of said surfaces;

comparing means, coupled to said second signal and said third signal, for determining the smaller of said second and said third distances;

a data output line coupled to said first signal and said second and third signals, logic means, coupled to the first sensor, second sensor, third sensor and comparing means, for activating said sensors in the cyclical order second sensor, first sensor, third sensor, first sensor, second sensor until said comparing means determines the smaller of said second and said third signals, said logic means thereafter alternately activating only said first sensor and the sensor determined to be providing the smaller signal;

whereby the signal appearing on said data output line will comprise a cycle of said second signal, first signal, third signal, first signal until the smaller of said second and said third signals is determined at which time the signal on said data output line will be alternately said first signal and the smaller of said second and said third signals.

22. A system for controlling the position of an object with respect to a first surface as a function of the distance of the object from second and third surfaces, comprising:

first transducer means coupled to said object for generating a first signal indicative of the distance of the object from the first surface;

second transducer means coupled to said object for generating a second signal indicative of the distance between said object and said second surface;

third transducer means coupled to said object for generating a third signal indicative of the distance between said object and the said third surface; and logic means coupled to said first, second and third transducer means, and being responsive to said first, second and third signals, for selectively activating each said transducer means, whereby upon energizing said system, said logic means sequentially activates each said transducer means until said logic means determines whether said object is closer to said second surface or said third surface whereupon said logic means sequentially activates only said first transducer means and the one of said second and third transducer means which has been determined to be closer to its respective surface.

* * * * *